United States Patent
Ginesi et al.

(10) Patent No.: US 7,463,678 B2
(45) Date of Patent: Dec. 9, 2008

(54) EQUALIZATION SCHEME FOR DSL RECEIVERS IN PRESENCE OF AN UNDER-SAMPLED OR OVER-SAMPLED TRANSMIT IDFT

(75) Inventors: Alberto Ginesi, Noordwijk (NL); Song Zhang, Kanata (CA); Andrew Deczky, Ottawa (CA); Duncan Baird, Nepean (CA); Christian Bourget, Hull (CA)

(73) Assignee: CIENA Corporation, Linthicum, MD (US)

( * ) Notice: Subject to any disclaimer, the term of this patent is extended or adjusted under 35 U.S.C. 154(b) by 1005 days.

(21) Appl. No.: 10/386,391

(22) Filed: Mar. 10, 2003

(65) Prior Publication Data

US 2004/0004936 A1 Jan. 8, 2004

(30) Foreign Application Priority Data

Mar. 11, 2002 (CA) .................................. 2375823

(51) Int. Cl.
*H03H 7/30* (2006.01)
*H03H 7/40* (2006.01)
*H03K 5/159* (2006.01)

(52) U.S. Cl. ...................... 375/231; 375/232; 375/260; 708/232; 708/233

(58) Field of Classification Search ................. 375/229, 375/230, 231, 232, 233, 234, 260; 708/232, 708/233

See application file for complete search history.

(56) References Cited

U.S. PATENT DOCUMENTS

| 5,606,575 | A | 2/1997 | Williams |
| 5,666,383 | A | 9/1997 | Huang et al. |
| 6,247,035 | B1 * | 6/2001 | Hellberg ..................... 708/420 |
| 6,404,806 | B1 * | 6/2002 | Ginesi et al. ................ 375/222 |
| 6,456,654 | B1 | 9/2002 | Ginesi et al. |
| 6,535,552 | B1 * | 3/2003 | Pessoa ........................ 375/231 |
| 6,744,821 | B1 * | 6/2004 | Van Acker et al. .......... 375/260 |
| 6,754,261 | B1 * | 6/2004 | Liu et al. .................... 375/232 |
| 6,834,079 | B1 * | 12/2004 | Strait et al. ................. 375/232 |
| 6,990,062 | B2 * | 1/2006 | Greaves et al. ............. 370/210 |
| 2002/0057734 | A1 * | 5/2002 | Sandberg et al. ........... 375/222 |

* cited by examiner

*Primary Examiner*—Phuong Phu
(74) *Attorney, Agent, or Firm*—Merek, Blackmon & Voorhees, LLC

(57) ABSTRACT

A circuit and method is provided for reducing the effect of having potentially different sizes for an Inverse Discrete Fourier Transform (IDFT) at a transmitter and a Discrete Fourier Transform (DFT) at a receiver in a telecommunications system without requiring a change in the DFT's size. The method includes following steps. The first step includes determining whether the IDFT size is greater than, equal to, or less than the DFT size. The second step includes selecting a target impulse response length from a predefined set of impulse response lengths in accordance with a result the previous step. The third step includes training an equalizer at the receiver to the target impulse response length. The circuit comprises hardware and software for implementing the method.

16 Claims, 5 Drawing Sheets

EQUALIZATION SCHEME FOR DSL RECEIVERS IN PRESENCE OF AN UNDER-SAMPLED OR OVER-SAMPLED TRANSMIT IDFT

The present invention relates generally to digital subscriber line (DSL) technology, and specifically to a method for improving data transmission in a discrete multi tone (DMT)-based communication system.

BACKGROUND OF THE INVENTION

It is well known that some current modems operating in accordance with G.992.1 and G.992.2 standards implement a transmitter with an Inverse Discrete Fourier Transform (IDFT) size greater than the one specified by the standards. These modems may implement the transmitter in either the upstream or downstream direction, or both. There are many reasons that may influence this decision. For example, for an upstream channel the standard IDFT size is 64 points. However, an IDFT size greater than 64 points may be justified for two reasons. The first reason is hardware symmetry with the downstream channel, since the downstream channel requires a larger Discrete Fourier Transform (DFT). The second reason is ease of implementation of different Annexes of the G.992.1 and G.992.2 standards with the same data path.

It is well know that Asymmetric Digital Subscriber Loop (ADSL) systems suffer from some performance degradation whenever there is a mismatch between the transmitter IDFT and receiver DFT sizes. This is particular true on short loops where the channel is Inter-Symbol Interference (ISI)—Inter-Channel Interference (ICI) dominated, as the DFT/IDFT size mismatch increases the ISI-ICI effects. Laboratory tests show that if the transmitter uses an IDFT other than that suggested by the standard on short loops, data rate penalties of approximately 25 to 30% are experienced.

However, if the transmitter IDFT size is known a priori, that is before training the receiver equalizer, the receiver DFT could possibly be changed to match the size of the transmit IFFT. This allows the performance to be optimized regardless of the IDFT size used by the transmitter. However, this solution has two potential problems. The first problem is the IDFT size may simply not be known a priori. The problem particularly applies to G.992.1 and G.992.2 modems, while new G.dmt-bis and G.lite-bis standards have G.hs codepoints defined for exchanging information about the transmitter IDFT. The second problem is the receiver may not be able to change the DFT size on the fly due to "Millions of Instructions per Second" (MIPS) or hardware limitations.

Thus there is a need for a system and method for allowing the transmitter to use an IDFT having a size different to that specified in the standard, while reducing data rate penalties. It is an object of the present invention to obviate or mitigate at least some of the above-mentioned disadvantages.

BRIEF SUMMARY OF THE INVENTION

In accordance with an aspect of the present invention, there is provided a circuit and method for reducing the effect of having potentially different sizes for an Inverse Discrete Fourier Transform (IDFT) at a transmitter and a Discrete Fourier Transform (DFT) at a receiver in a telecommunications system without requiring a change in the DFT's size. The method includes following steps. The first step includes determining whether the IDFT size is greater than, equal to, or less than the DFT size. The second step includes selecting a target impulse response length from a predefined set of impulse response lengths in accordance with a result the previous step. The third step includes training an equalizer at the receiver to the target impulse response length. The circuit includes hardware and software for implementing the method.

It is an advantage of the present invention that the transmitter can use an IDFT having a size different to that specified in the standard without requiring a priori knowledge of the transmitter size IDFT or requiring the DFT size to change.

BRIEF DESCRIPTION OF THE DRAWINGS

Embodiments of the present invention will now be described by way of example only with reference to the following drawings in which:

FIG. 4b is an upsampled version of the DMT symbol illustrated in FIG. 4a;

DETAILED DESCRIPTION OF THE INVENTION

Figure 1:
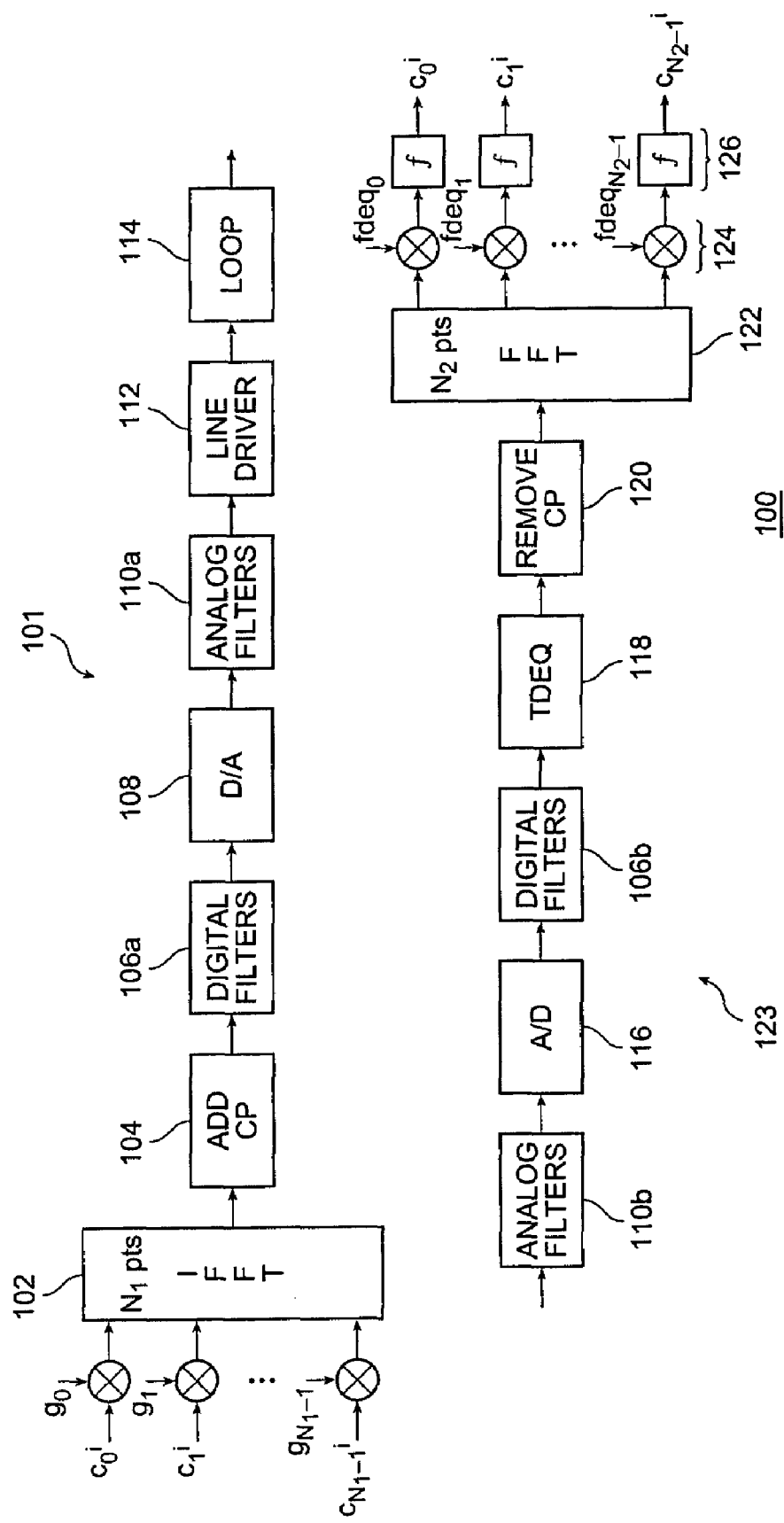
FIG. 1 is block diagram of a Discrete MultiTone (DMT) communication system (prior art)

For convenience, like numerals in the description refer to like structures in the drawings. In the present embodiment, the IDFT is implemented using an Inverse Fast Fourier Transform (IFFT) and the DFT is implemented using a Fast Fourier Transform (FFT). Other implementations will be apparent to a person skilled in the art.

Referring to FIG. 1, a Discrete MultiTone (DMT) communication system in accordance with the prior art is illustrated generally by numeral 100. The communication system comprises a transmitter 101, a loop 114 and a receiver 123. The transmitter includes an IFFT 102, a prefix adder 104, digital filters 106a, a digital-to-analog (D/A) converter 108, analog filters 10a, and a line driver 112. The receiver 123 includes analog filters 110b, digital filters 106b, an analog-to-digital (A/D) converter 116, a time domain equalizer (TDEQ) 118, a prefix remover 120, and an FFT 122. Typically, the prefix is a cyclic prefix (CP). The IFFT 102 is coupled to the loop 114 via the prefix adder 104, the digital filters 106a, the D/A converter 108, the analog filters 110a, and the line driver 112, which is coupled to the loop 114. The FFT 122 is coupled to the loop 114 via the prefix remover 120, the TDEQ 118, the digital filters 106b, the A/D converter 116, and the analog filters 110b, which are coupled to the loop 114. Further, the receiver 123 includes circuitry for implementing the method described herein, as will be appreciated by a person skilled in the art.

In the transmitter 101, for every DMT symbol period, a set of $N_1$ Quadrature Amplitude Modification (QAM) symbols is used to modulate a set of $N_1$ tones. For simplicity, $N_1$ is referred to as the size of the IFFT even though the actual size is $2*N_1$, including the conjugate pairs for each carrier. This is achieved by feeding the QAM symbols $c_l^i$, where $l=0, 1, \ldots, N_1-1$, to the IFFT input, and where the index i indicates the DMT symbol period.

Each QAM symbol $c_l^i$ carries $b_l$ bits, where $b_l$ is referred to as the bit allocation table and $l=0, 1, \ldots, N_1-1$. Further, each QAM symbol $c_l^i$ is scaled by a fine gain $g_l$, where $l=0, 1, \ldots, N_1-1$, before being processed by the IFFT 102. These fine gains are used to change the transmit power in each tone individually. In order for the transmission signal to be real, complex Hermitian symmetry has to be met among the transmit QAM symbols $c_l^i$. That is, $c_l^i=c^*N_l-l_i$. At the IFFT output, the CP is added to the DMT symbol, or transmit frame, which is then further conditioned by the transmitter's front end, including the digital filters 106a, D/A converter 108, analog filters 110a and line driver 112, before being transmitted on the line. At the receiver side, the receiver's front end processes the received signal using analog filtering 110b, A/D conversion 116 and digital filtering 106b. The TDEQ 118 then partially equalizes the signal at the output of the receiver front end. After the CP has been stripped off, an FFT is performed on the receiver frame. At the FFT output, a per-tone single tap Frequency Domain Equalizer (FDEQ) 124 completes the equalization of the signal, and a set of slicers 126 finally retrieves the transmitted QAM symbols $c_l^i$.

The size $N_2$ of the receiver FFT 122 can, in general, be different than the size $N_1$ of the transmitter IFFT 102. Similarly to the IFFT, the actual size of the FFT is $2*N_2$, including the conjugate pairs for each carrier. It will be apparent that the factor of two can be dropped from both the size of the IFFT and the size of the FFT for the purpose of the present discussion as they will be compared as a ratio. While it is always possible to choose a value for $N_2$ that is greater than $N_1$, $N_2$ can be less than $N_1$ only if the number of tones that carry data is less than $N_1/2$. Note also, that if the values for $N_2$ and $N_1$ are not equal, the clocks at which the IFFT and FFT run, $fs_1$ and $fs_2$ respectively, are also different. Particularly, in order to have the same carrier spacing at the transmitter and the receiver, the following relationship should be met:

$$\frac{fs_1}{N_1} = \frac{fs_2}{N_2} \qquad (1)$$

Accordingly, the number of samples added in the transmitter and removed in the receiver as a CP varies in accordance with $$Cp_1/Cp_2=fs_1/fs_2 \qquad (2)$$

where $Cp_1$ and $Cp_2$ are the number of samples corresponding to the cyclic prefix in the transmitter and the receiver respectively.

The following description examines the situations for which $N_1$ is a multiple of $N_2$, representing an over-sampled IFFT, and $N_2$ is a multiple of $N_1$, representing an under-sampled IFFT. It is possible, but unlikely, that $N_1$ is not an integer multiple of $N_2$ and vice versa. This is because the standard specifies DSL bands as having power-of-two number of carriers and because the most efficient algorithms to implement a DFT/IDFT (including FFT) are powers of two. That being said, it is believed the analysis as follows is applicable to cases where the ratio of $N_1$ to $N_2$, or vice versa, is non-integer.

Figure 2:
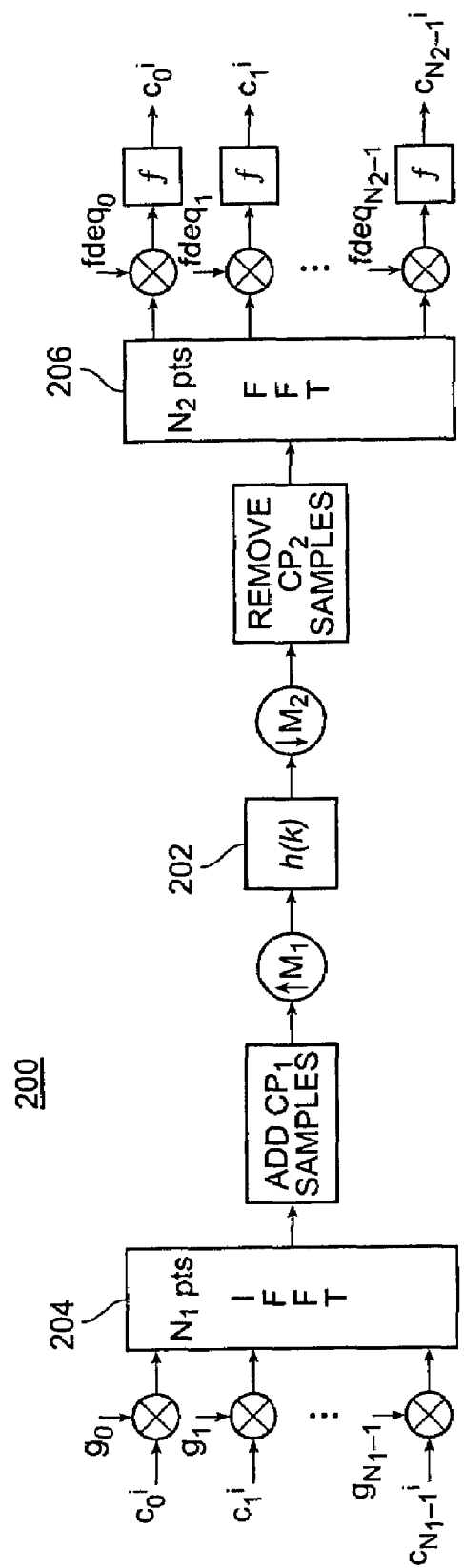
FIG. 2 is digital model of an improvement on the system illustrated in FIG. 1 according to an embodiment of the present invention.

Referring to FIG. 2, an all-digital model of an improvement on the system depicted in FIG. 1 is illustrated by numeral 200. For this model 200 it has been assumed that the analog portion 110 of the communication channel has a finite bandwidth B so that it can be simulated by a digital filter 202 with impulse response $h_{chan}(k)$ at sampling frequency $fs>2B$. Further, $$fs/fs_1=M_1 \qquad (3)$$

and $$fs/fs_2=M_2 \qquad (4)$$

where $M_1$ and $M_2$ are integers. Yet further, the transmit and receive digital filters including the TDEQ, can be up-sampled to the same clock frequency and their resulting impulse responses can be convolved with $h_{chan}(k)$, for a filter 202 with an overall channel impulse response $h(k)$. As a result, DMT symbols from the transmitter are upsampled by $M_1$, once the CP has been added, from the sampling frequency $fs_1$ of the transmitter IFFT 204 to the sampling frequency fs of the filter 202. Similarly, at the receiver, the DMT symbols are down-sampled by $M_2$ before removing the CP, from the sampling frequency fs of the filter 202 to the sampling frequency $fs_2$ of the receiver FFT 206.

Under-Sampled Case

From equations (3) and (4), it can be seen that $M_1$ and $M_2$ are inversely proportional to $fs_1$ and $fs_2$, respectively. Thus, for the case of an under-sampled IFFT, the sampling frequency $fs_1$ of the IFFT is less than sampling frequency $fs_2$ of the FFT, and $M_1$ is greater than $M_2$. As a result, M1 can be expressed as $M_1=M \times M_2$, where M is an integer that corresponds to the ratio between the FFT and IFFT sizes. Thus, in the present embodiment, the FFT is M times larger than the IFFT. Also, from equations (2), (3), and (4), it can be seen that $$Cp_2/Cp_1=M \qquad (5)$$

Figure 3:
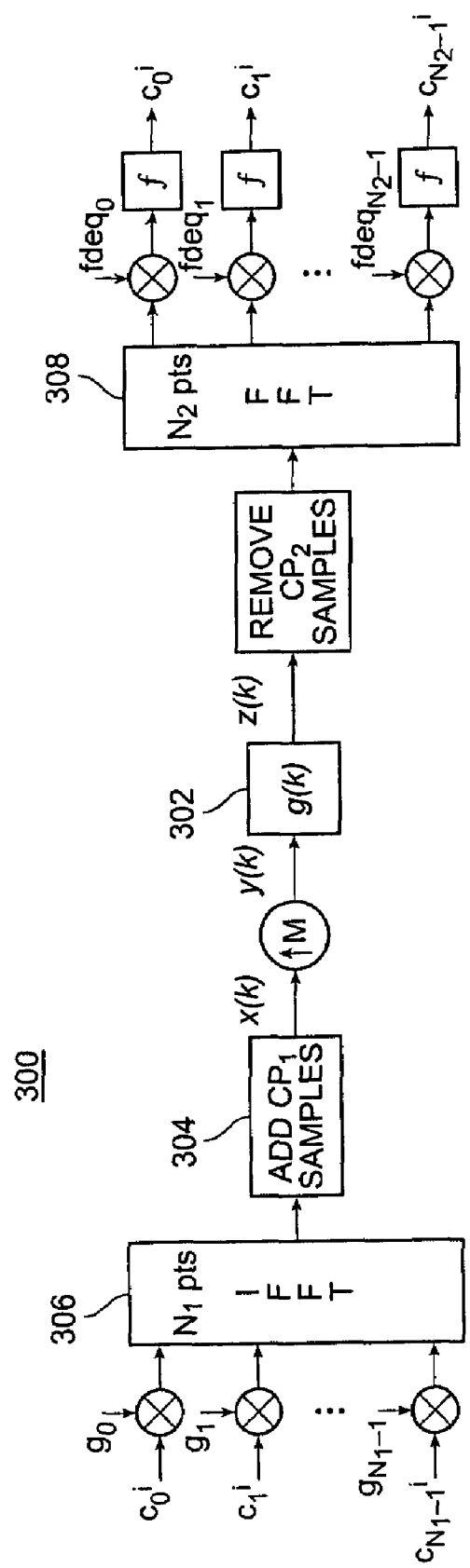
FIG. 3 is a further simplified digital model of the system illustrated in FIG. 2 for an under-sampled IFFT.

Thus, the model 200 illustrated in FIG. 2 can be further simplified. Referring to FIG. 3, an all-digital model for an over-sampled IFFT is illustrated generally by numeral 300. The filter 302 of the present model is represented by $g(k)$. It can be seen that in the under-sampled case, the system 300 of FIG. 3 is equivalent to the system 200 in FIG. 2 for $g(k)=h(M_2 \times k)$ and $fs=fs_2$. Thus, output $x(k)$ of the CP adder 304 is upsampled by M from the sampling frequency $fs_1$ of the IFFT 306 to the sampling frequency fs of the filter $g(k)$ 302. The upsampled DMT symbol is represented by $y(k)$ and the filtered DMT symbol is represented by $z(k)$.

For the model 300 illustrated in FIG. 3, it is desirable to determine the condition for which the transmission is ISI-ICI free. Toward this end, it is assumed that the filter $g(k)$ 302 is time-limited to an interval $[0, L-1]$ as expressed in number of samples at the sample frequency fs of the filter $g(k)$ 302. In the present embodiment, zero propagation delay is assumed for simplifying the notations. However, a person skilled in the art will be able to verify that the results described herein would also apply in presence of any propagation delay. At the receiver, the frame alignment is such that the first DMT frame to be processed by the FFT 308 is at start time instant $t=0$.

Figure 4A:
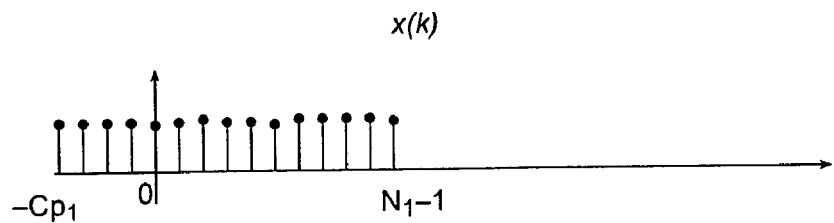
FIG. 4a is a sample DMT symbol.
Figure 4B:
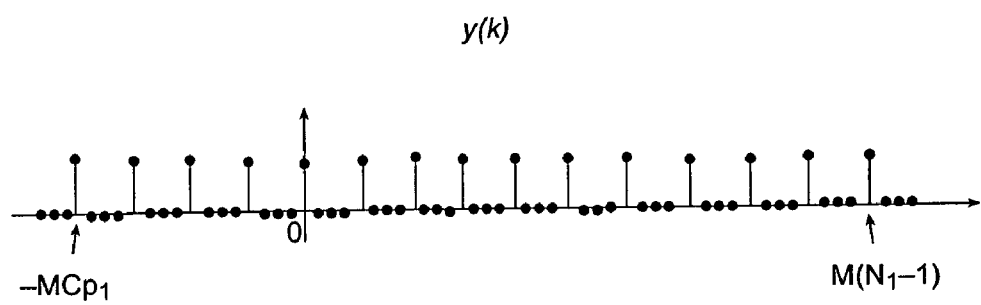
Figure 4C:
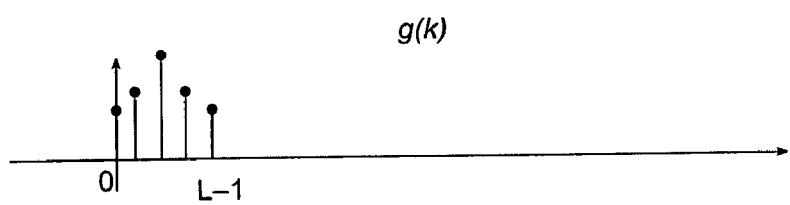
FIG. 4c is a sample impulse response.

Referring to FIG. 4a, an example of a DMT symbol $x(k)$ to be transmitted is illustrated. Referring to FIG. 4b, an upsampled representation $y(k)$ of the DMT $x(k)$ is illustrated for M=4. Referring to FIG. 4c, a representation of the transfer function of the filter $g(k)$ is illustrated. It is assumed that the origin of the time axis is fixed as shown in FIGS. 4a-4c.

As illustrated in FIG. 3, the filtered signal $z(k)$ is given by the convolution between $y(k)$ and $g(k)$. Instead of computing the convolution analytically, the desired result can be achieved by inspection of FIGS. 4a-4c. The convolution between the two functions $y(k)$ and $g(k)$ involves flipping $g(k)$ around the origin and computing the sum of the correlation between the two signals for different relative time delays. It can be seen that the result of the convolution between $g(k)$ and $y(k)$ can be divided into three sections. A first section comprises an initial transient, a second section comprises a steady state-like waveform, and a final section comprises a final transient. Each of these sections corresponds to different values of k as well as to different relative positions of g(k−n) and y(n) in the convolution operation, as will be appreciated by a person skilled in the art. The first and the final transients correspond to a partial overlap between the two signals, while the steady state-like waveform corresponds to a full overlap between the two signals. Due to the presence of the zeros in the upsampled signal y(k), it can be seen that the first transient occurs for $-MCp_1 \leq k \leq -MCp_1-M+L-1$, while the final transient occurs for $M(N_1-1)+M \leq k \leq M(N_1-1)+L-1$.

At the receiver, $Cp_2$ samples are removed from received signal z(k). For the first DMT symbol, the cyclic prefix $Cp_2$ is removed for $k=-Cp_2, \ldots, -1$. The following $N_2$ samples, that is for $k=0, \ldots, N_2-1$, represent the first DMT symbol itself. For the second DMT symbol, the cyclic prefix $Cp_2$ is removed for the following $Cp_2$ samples, that is for $k=N_2, \ldots, N_2+Cp_2-1$. This process for removing the CP is repeated periodically every $N_2$ received samples. Therefore, in order to be ISI-ICI free, the first transient of z(k) should be confined to the time window where the first CP is removed, while the last transient of z(k) should be confined to the time window where the second CP is removed. Mathematically, these limitations are represented as follows.

For the initial transient, the lower bound of k is $-MCp_1$. The lower bound of k for the cyclic prefix for the first DMT symbol is $-Cp_2$. Thus, to ensure that the initial transient is within the cyclic prefix, as desired, the lower bound of the initial transient should be at least equivalent to the lower bound for the cyclic prefix, or $$MCp_1 > -Cp_2-1 \qquad (6)$$

Since, from equation (5), $Cp_2=MCp_1$, equation (6) can be rewritten as $Cp_2<Cp_2+1$, which is always true.

Similarly, for the initial transient, the upper bound of k is $-MCp_1-M+L-1$. The upper bound of k for the cyclic prefix for the first DMT symbol is $-1$. Thus, to ensure that the initial transient is with the cyclic prefix, as desired, the upper bound of the initial transient should be at most equivalent to the upper bound for the cyclic prefix, or $$MCp_1-M+L-1<0 \qquad (7)$$

Equation (7) can be rewritten as $-MCp_1-M+L<-1$, which can be rewritten as $L \leq MCp_1+M$. From equation (5), the previous equation can be rewritten as $L \leq Cp_2+M$.

For the final transient, the lower bound of k is $M(N_1-1)+M$. The lower bound of k for the cyclic prefix for the second DMT symbol is $N_2$. Thus, to ensure that the initial transient is within the cyclic prefix, as desired, the lower bound of the initial transient should be at least equivalent to the lower bound for the cyclic prefix, or $$M(N_1-1)+M>N_2-1 \qquad (8)$$

Equation (8) can be rewritten as $MN_1-M+M>N_2-1$, which can be rewritten as $MN_1>N_2-1$. Since $N_2=MN_1$, the equation can be rewritten as $N_2>N_2-1$, which is always true.

Similarly, for the final transient, the upper bound of k is $M(N_1-1)+L-1$. The upper bound of k for the cyclic prefix for the second DMT symbol is $N_2+Cp_2-1$. Thus, to ensure that the initial transient is with the cyclic prefix, as desired, the upper bound of the initial transient should be at most equivalent to the upper bound for the cyclic prefix, or $$M(N_1-1)+L-1<N_2+Cp_2 \qquad (9)$$

Equation (9) can be rewritten as $M(N_1-1)+L-1<MN_1+MCp_1$, which can be rewritten as $L \leq MCp_1+M$. From equation (5), the previous equation becomes $L \leq =Cp_2+M$.

Thus, the conclusion from both the first and final transients is that for an under-sampled IFFT, the ISI-ICI free condition is guaranteed if the length of the total channel impulse response g(k) is less than the CP length at the receiver side plus the ratio between the FFT and IFFT sizes. It should also be noted that the impulse response g(k) also corresponds to the shortened impulse response of the channel, as it matches to the convolution between the TDEQ and the channel impulse response at the FFT clock frequency. Therefore, in order to achieve the desired channel impulse response g(k), when training the TDEQ the target impulse response length can be set to $Cp_2+M$.

Over-Sampled Case

In the over-sampled case, $M_2$ can be expressed as $M_2=M \times M_1$ where M is an integer that also corresponds to the ratio between the IFFT and FFT sizes. Thus, in the present embodiment, the IFFT is M times larger than the FFT. Also, the relationship between the cyclic prefix $Cp_1$ of the transmitter and the cyclic prefix $Cp_2$ of the receiver can be expressed as $$Cp_1/Cp_2=M \qquad (10)$$

Figure 5:
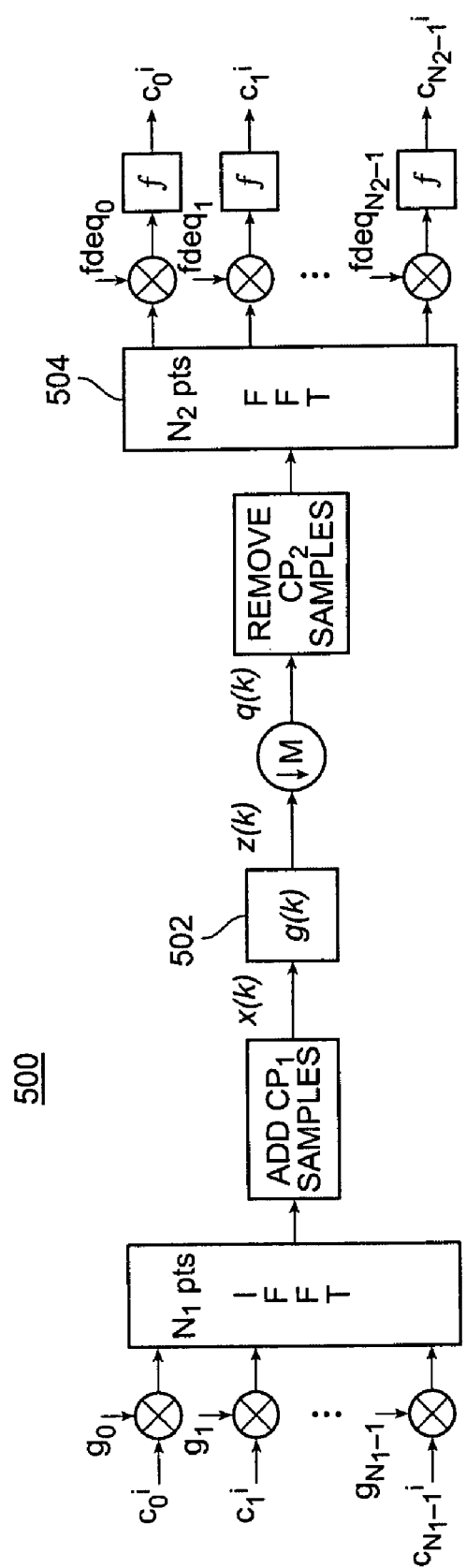
FIG. 5 is a further simplified digital model of the system illustrated in FIG. 2 for an over-sampled IFFT.

Similarly to the under-sampled case, the model 200 illustrated in FIG. 2 can be further simplified for the over-sampled case. Referring to FIG. 5, an all-digital model for an over-sampled IFFT is illustrated generally by numeral 500. The filter 502 of the present model is represented by g(k). It can be seen that in the over-sampled case, the system of FIG. 5 is equivalent to the system in FIG. 2 for $g(k)=h(M_1 \times k)$ and $fs=fs_1$. Thus, output z(k) of the filter 502 is downsampled by M from the sampling frequency fs of the filter g(k) to the sampling frequency $fs_2$ of the FFT 504. The downsampled DMT symbol is represented by q(k).

As in the previous embodiment, for the model 500 illustrated in FIG. 5 it is desirable to determine the condition for which the transmission is ISI-ICI free. Toward this end, it is assumed that the filter g(k) 502 is time-limited to an interval [0, L−1] as expressed in number of samples at the sampling frequency fs of the filter g(k) 502. In the present embodiment, zero propagation delay is assumed for simplify the notations. However, a person skilled in the art will be able to verify that the results described herein would also apply in presence of any propagation delay.

As illustrated in FIG. 5, the filtered signal z(k) is given by the convolution between x(k) and g(k). Similarly to the previous embodiment, the desired result can be achieved by inspection of FIGS. 4a and 4c. FIG. 4b is irrelevant for the present embodiment. The convolution between the two functions x(k) and g(k) involves flipping g(k) around the origin and computing the sum of the correlation between the two signals for different relative time delays.

By resorting to a similar argument as in the previous embodiment, it can be seen that the initial and final transients of the signal z(k) when transmitting only one DMT symbol around the time origin take place for $-Cp_1 \leq k \leq -Cp_1-1+L-1$ and for $N_1 \leq k \leq N_1-1+L-1$. Further, the steady state-like signal occurs for $0 \leq k \leq N_1-1$. However, the signal z(k) is downsampled by a factor of M to yield q(k), from which $Cp_2$ samples of cyclic prefix are removed. Therefore, the steady state-like signal for q(k) occurs for $0 \leq k \leq N_1/M-1/M=N_2-1/M$. Since $N_2-1/M$ is not an integer, the upper bound of the interval becomes $N_2-1$, as expected, since the FFT 504 at the receiver needs $N_2$ samples for each DMT symbols. For the transient duration, the following constraints apply.

For the initial transient, the lower bound of k is $-Cp_1/M$. The lower bound of k for the cyclic prefix for the first DMT symbol is $-Cp_2$. Thus, to ensure that the initial transient is within the cyclic prefix, as desired, the lower bound of the initial transient should be at least equivalent to the lower bound for the cyclic prefix, or $$Cp_1/M > -Cp_2 - 1 \quad (11)$$

Since $Cp_1/Cp_2 = M$, the equation can be rewritten as $Cp_2 < Cp_2 + 1$, which is always true.

Similarly, for the initial transient, the upper bound of k is $(-Cp_1 - 1 + L - 1)/M$. The upper bound of k for the cyclic prefix for the first DMT symbol is $-1$. Thus, to ensure that the initial transient is with the cyclic prefix, as desired, the upper bound of the initial transient should be at most equivalent to the upper bound for the cyclic prefix, or $$(-Cp_1 - 1 + L - 1)/M < 0 \quad (12)$$

The equation can be rewritten as $L < Cp_1 + 2$, which can be rewritten as $L \leq Cp_1 + 1$.

For the final transient, the lower bound of k is $N_1/M$. The lower bound of k for the cyclic prefix for the second DMT symbol is $N_2$. Thus, to ensure that the initial transient is within the cyclic prefix, as desired, the lower bound of the initial transient should be at least equivalent to the lower bound for the cyclic prefix, or $$N_1/M > N_2 - 1 \quad (13)$$

Similarly, for the final transient, the upper bound of k is $((N_1 - 1) + L - 1)/M$. The upper bound of k for the cyclic prefix for the second DMT symbol is $N_2 + Cp_2 - 1$. Thus, to ensure that the initial transient is with the cyclic prefix, as desired, the upper bound of the initial transient must be at most equivalent to the upper bound for the cyclic prefix, or $$(N_1 + L - 2)/M < N_2 + Cp_2 \quad (14)$$

Since $N_1 = MN_2$ and $Cp_1 = MCp_2$, the equation can be rewritten as $N_1 + L - 2 < N_1 + Cp_1$, which can be rewritten as $L < Cp_1 + 2$, which can further be rewritten as $L \leq Cp_1 + 1$.

Thus, the conclusion from both the first and final transients is for an over-sampled IFFT, the ISI-ICI free condition is guaranteed if the length of the total channel impulse response g(k) is less than the CP length at the transmitter side plus one. It should also be noted that the impulse response g(k) also corresponds to the shortened impulse response of the channel, as it matches to the convolution between the TDEQ and the channel impulse response at the FFT clock frequency. Therefore, in order to achieve the desired channel impulse response g(k), when training the TDEQ the target impulse response length can be set to $Cp_1 + 1$.

For yet a further embodiment, a situation is illustrated for an over-sampled IFFT where the channel impulse response is advanced by D samples at the IFFT clock frequency. The same steps performed above are repeated, and the results are provided as follows.

For the initial transient, from the lower bound it can be determined that $(Cp_1 + D)/M < Cp_2 + 1$. This equation can be rewritten as $Cp_1 + D < Cp_1 + M$ which is true for all cases where $D < M$.

From the upper bound it can be determined that $(-Cp_1 - 1 - D + 1 + L - 1)/M < 0$. This equation can be rewritten as $-Cp_1 - D + L - 1 < 0$, or $L < Cp_1 + D + 1$, which is met if $L < Cp_1 + 1$.

For the final transient, from the lower bound it can be determined that $(N_1 - D)/M > N_2 - 1$, which can be rewritten as $N_1 - D > N_1 - M$, which is true for all $D < M$.

From the upper bound it can be determined that $(N_1 + L - D + 1 - 2)/M < N_{2+Cp2}$. This equation can be rewritten as $N_1 + L - D - 1, + Cp_1$, or, $L < Cp_1 + D + 1$, which is met if $L < Cp_1 + 1$.

Therefore, the ISI-ICI free condition is met even when the channel impulse response g(k) is advanced by up to M−1 samples. This result shows that there is not just one optimum frame alignment when the transmitter IFFT is over-sampled. Given the above results, it is easy to envision that when in the presence of the channel impulse response g(k) that is not time strictly time limited, one of the frame alignments as per above would result in the least ISI-ICI interference, or best capacity.

Application

If the transmitter IFFT size is known a priori, then the results of the previous sections can simply be applied at the receiver for improving performance. For the case where $N_1 = N_2$, the best equalization technique is to train the TDEQ and the FDEQ with the length of the target impulse response equal to $Cp_1 + 1$, which is equal to $Cp_2 + 1$. If, however, $N_1$ is less than $N_2$ then the best strategy is to train the TDEQ and the FDEQ with a target impulse response with length $Cp_2 + M$. Lastly, if $N_1$ is greater than $N_2$, then the best strategy is to train the TDEQ and the FDEQ with a target impulse response with length $Cp_1 + 1$. For this case, the performance can be further improved by searching for an optimum frame alignment between $[0, (M-1)/fs_1]$.

However, if the IFFT size is not known, a technique referred to herein as a "blind technique" is used to estimate the optimum equalization strategy. It is assumed that the receiver desires to use a fixed FFT size and does not know the transmitter IFFT size. The IFFT can be either equal, lesser (under-sampled IFFT) or greater (over-sampled IFFT) than the receiver FFT size. Given that M is typically a small number, less than four (4) in most of the cases, the following procedure optimizes the transmission.

A set of TDEQ pairs and FDEQ pairs is trained, each with different target impulse response length, that is $Cp_1 + 1$, $Cp_2 + 1$, $Cp_2 + 2$, ..., $Cp_2 + M_{max}$, where $M_{max}$ is a maximum expected value for M. Typically the value for $M_{max}$ is programmable. During a Channel Analysis portion of the modem's initialization, each TDEQ/FDEQ pair of the set is applied and a quick per-bin signal to noise ratio (SNR) estimate is performed. For the TDEQ/FDEQ pair trained with target impulse response $Cp_1 + 1$, a set of per-bin SNR estimates is also performed, each for a different time advance in the interval $[0, (M-1)/fs_1]$. This interval can be quantized such that only a few values need to be tried. The time advance is applied, for example, by reducing the delay of a tap delay line in the modem front end at a clock frequency higher then the FFT clock frequency. The ratio of this clock frequency and $fs_2$ determine the granularity of the search. Lastly, the total per bin SNR estimates are compared and the one with the highest geometric average is selected together with the associated TDEQ/FDEQ pair and time advance value.

Figure 6:
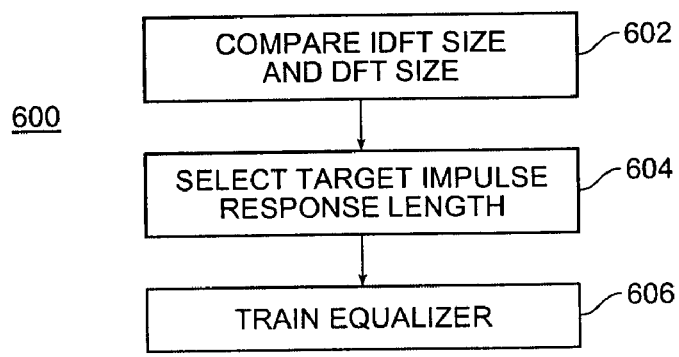
FIG. 6 is a block diagram of a method according to an embodiment of the present invention.

FIG. 6 is a block diagram summarizing the steps 600 performed in an embodiment of the present invention. In step 602, it is determined whether the IDFT size of the IDFT is greater than, equal to, or less than the DFT size of the DFT. In step 604, a target impulse response length is selected from a predefined set of impulse response lengths in accordance with a result of step 602. In step 606, the equalizer at the receiver is trained to the target impulse response length. The details of these steps 600 are as described above in the previous sections. These steps 600 and their further details may be performed by implementing the structures 200, 300 and 500 shown in FIGS. 2, 3 and 5. Such structures may include hardware, software, firmware, programmable logic, etc. as appropriate when implemented by one of ordinary skill in the art.

Therefore, the process provides an improved equalization strategy for ADSL receivers when in the presence of transmitters with an IFFT size that potentially may not match the FFT size at the receiver. The proposed techniques involve minor modifications to the equalizer's training algorithm and allow use of a fixed size FFT at the receiver. The performance improvements that result have to shown to be quite significant.

Although the invention has been described with reference to certain specific embodiments, various modifications thereof will be apparent to those skilled in the art without departing from the spirit and scope of the invention as outlined in the claims appended hereto.

What is claimed is:

1. A method of reducing an effect of having potentially different sizes for an Inverse Discrete Fourier Transform (IDFT) at a transmitter and a Discrete Fourier Transform (DFT) at a receiver in a telecommunications system without requiring a change to a DFT size of said DFT, said method comprising the steps of:
    (a) determining whether an IDFT size of said IDFT is greater than, equal to, or less than said DFT size;
    (b) selecting a target impulse response length of a desired channel impulse response from a predefined set of impulse response lengths in accordance with a result of step (a); and
    (c) training an equalizer at said receiver to said target impulse response length.

2. A method as defined in claim 1, wherein said predefined set of impulse response lengths is defined such that transients in a transmission signal coincide with a cyclic prefix of said transmission signal.

3. A method as defined in claim 2, wherein an initial transient coincides with a cyclic prefix of an associated signal and a final transient coincides with a cyclic prefix of a following signal that follows said associated signal.

4. A method as defined in claim 1, wherein if said IDFT size is equal to said DFT size, said target impulse response length is set to a value equal to or less than a cyclic prefix length at either said transmitter or said receiver plus one.

5. A method as defined in claim 1, wherein if said IDFT size is less than said DFT size, said target impulse response length is set to a value equal to or less than a cyclic prefix length at said receiver plus a ratio between said DFT size and said IDFT size.

6. A method as defined in claim 1, wherein if said IDFT size is greater than said DFT size, said target impulse response length is set to a value equal to or less than a cyclic prefix length at said transmitter plus one.

7. A method as defined by claim 1, wherein said step (a) is achieved by comparing said IDFT size and said DFT size communicated between said transmitter and said receiver.

8. A method as defined in claim 7, wherein said IDFT size and said DFT size are communicated between said transmitter and said receiver during handshaking.

9. A method as defined in claim 1, wherein said step (a) comprises the following steps:
    (d) training said equalizer with a plurality of impulse response lengths;
    (e) estimating a per-bin signal-to-noise ratio for each of said plurality of impulse response lengths;
    (f) determining a highest signal-to-noise ratio; and
    (g) selecting an impulse response length associated with said highest signal-to- noise ratio for use as said target impulse response length.

10. A method as defined in claim 9, wherein said plurality of impulse response lengths include impulse response lengths ranging from a cyclic prefix length at said receiver to a cyclic prefix length at said receiver plus a maximum expected ratio between said DFT size and said IDFT size.

11. A method as defined in claim 9, wherein said plurality of impulse response lengths includes an impulse response length equal to a cyclic prefix length at said transmitter plus one.

12. A method as defined in claim 1, wherein said equalizer is trained at a impulse response length representing said IDFT size greater than said DFT size, farther comprising the steps of:
    (d) defining a time advance interval;
    (e) estimating a per-bin signal-to-noise ratio for each of a plurality of predefined values in said time advance interval;
    (f) determining a highest signal-to-noise ratio; and
    (g) selecting a value in said time advance interval associated with said highest signal-to-noise ratio for selecting an optimal frame alignment.

13. A method as defined in claim 1, wherein said equalizer is a time domain equalizer (TDLQ).

14. A method as defined in claim 1, wherein said equalizer is a frequency domain equalizer (FDLQ).

15. A method as defined in claim 1, wherein said IDFT is an Inverse Fast Fourier Transform and said DFT is a Fast Fourier Transform.

16. A digital subscriber line (DSL) telecommunications system including a transmitter and a receiver, said transmitter having an Inverse Discrete Fourier Transform (IDFT) and said receiver having a Discrete Fourier Transform (DFT), said DSL telecommunications system including circuitry to perform processing comprising the steps of:
    (a) determining whether an IDFT size of said IDFT is greater than, equal to, or less than a DFT size of said DFT;
    (b) selecting a target impulse response length of a desired channel impulse response from a predefined set of impulse response lengths in accordance with a result of step (a); and
    (c) training an equalizer at said receiver to said target impulse response length.

* * * * *